United States Patent
Nakayama et al.

(10) Patent No.: US 11,238,219 B2
(45) Date of Patent: Feb. 1, 2022

(54) SENTENCE EXTRACTION SYSTEM, SENTENCE EXTRACTION METHOD AND INFORMATION STORAGE MEDIUM

(71) Applicant: RAKUTEN GROUP, INC., Tokyo (JP)

(72) Inventors: Yuki Nakayama, Tokyo (JP); Makoto Tsutsumi, Tokyo (JP); Koji Murakami, Eastchester, NY (US)

(73) Assignee: RAKUTEN GROUP, INC., Tokyo (JP)

( * ) Notice: Subject to any disclaimer, the term of this patent is extended or adjusted under 35 U.S.C. 154(b) by 202 days.

(21) Appl. No.: 16/432,933

(22) Filed: Jun. 6, 2019

(65) Prior Publication Data
US 2020/0387569 A1 Dec. 10, 2020

(51) Int. Cl.
G09B 7/02 (2006.01)
G06F 40/211 (2020.01)
G06F 40/295 (2020.01)
G06F 16/33 (2019.01)

(52) U.S. Cl.
CPC .......... G06F 40/211 (2020.01); G06F 40/295 (2020.01); *G06F 16/3347* (2019.01); *G09B 7/02* (2013.01)

(58) Field of Classification Search
CPC .............................. G09B 7/02; G06F 16/3347
See application file for complete search history.

(56) References Cited

U.S. PATENT DOCUMENTS

| | | | |
|---|---|---|---|
| 7,720,675 B2* | 5/2010 | Burstein | G06F 40/253 704/9 |
| 2004/0010458 A1* | 1/2004 | Friedman | G06Q 40/00 705/35 |
| 2006/0078862 A1* | 4/2006 | Goto | G09B 7/02 434/322 |
| 2007/0276829 A1* | 11/2007 | Wang | G06F 16/3334 |
| 2012/0078612 A1* | 3/2012 | Kandekar | G06F 3/0482 704/9 |
| 2016/0343086 A1* | 11/2016 | Mondal | G06F 40/258 |

FOREIGN PATENT DOCUMENTS

JP 2009140411 A 6/2009

OTHER PUBLICATIONS

Hiroyuki Sakai, Hiroko Nishizawa, Shogo Matsunami, and Hiroki Sakaji, "Extraction of causal information from PDF files of the summary of financial statenments of companies" in Journal of Japanese Society for Artificial Intelligence, vol. 30, No. 1, pp. 172-182, (2015). [Concise explanation of relevance satisfied with English abstract and the discussion in the background of invention section of the present application from p. 1, line 14 to p. 2, line 1.].
Office Action of Jun. 30, 2020, for corresponding JP Patent Application No. 2019-221991 with partial English translation.

* cited by examiner

*Primary Examiner* — Feng-Tzer Tzeng
(74) *Attorney, Agent, or Firm* — HEA Law PLLC

(57) ABSTRACT

At least one processor of a sentence extraction system specifies at least one candidate sentence based on a predetermined extraction condition, the candidate sentence being a candidate for a sentence to be extracted from among a plurality of sentences; specifies at least one linked sentence that has a link to the at least one candidate sentence; and determines whether to extract the at least one linked sentence, based on whether to extract the at least one candidate sentence.

13 Claims, 10 Drawing Sheets

ABC Company

The Third Quarter Financial Settlement
Report for Fiscal Year Ended December 2018

November 15, 2018

1. Financial Results for Third Quarter for Fiscal Year Ended December 2018
   (January 1, 2018 to September 30, 2018)

(1) Consolidated Business Result (Accumulated)

|  | Sales Profit | | Operating Profit | | ... |
|---|---|---|---|---|---|
|  | million yen | % | million yen | % | |
| 3rd Quarter for Fiscal Year ended December 2018 | 123,456 | 9.8 | 21,524 | 69.5 | ... |
| 3rd Quarter for Fiscal Year ended December 2017 | 112,345 | 4.5 | 12,698 | 22.3 | |

·
·
·

(A) Domestic Operations

Profit from domestic operations increased from the corresponding period last year with decreased sales in canned products and increased sales in pre-packaged foods and seasonings.

By items, profit from pre-packaged foods increased in curries and stews and decreased in baby foods.

·
·
·

Profit in seasonings increased with demand boosted by the influence of TV programs.

(B) Overseas Operations

·
·
·

(C) Net Asset

Net asset increased by ¥5 million from the end of the previous consolidated fiscal year to ¥1 billion.

This is mainly attributed to an increase of ¥7 million in retained earnings and a decrease of ¥2 million in foreign exchange conversion adjustment account.

(3) Management Policy and Strategy

| COMPANY NAME | ATTRIBUTE | FINANCIAL REPORT | PERFORMANCE FACTOR SENTENCE |
|---|---|---|---|
| ABC COMPANY | FISHERY PROCESSING | FINANCIAL REPORT DATA A | — |
| DEF COMPANY | APPAREL | FINANCIAL REPORT DATA B | EXTRACTED DATA B |
| GHI COMPANY | MANUFACTURING | FINANCIAL REPORT DATA C | — |
| . | . | . | . |
| . | . | . | . |
| . | . | . | . |

| ATTRIBUTE | COMPANY KEYWORD | KEY EXPRESSION |
|---|---|---|
| FISHERY PROCESSING | BONITO<br>MACKEREL<br>FISH CATCH<br>.<br>.<br>. | WAS VERY GOOD<br>WAS GOOD<br>WAS BAD<br>.<br>.<br>. |
| APPAREL | SHIRT<br>SKIRT<br>COAT<br>.<br>.<br>. | WAS POPULAR<br>WAS SOLD<br>MADE A TREND<br>.<br>.<br>. |
| .<br>.<br>. | .<br>.<br>. | .<br>.<br>. |

| SENTENCE | CANDIDATE SENTENCE FLAG | SCORE | LINKED SENTENCE INFORMATION | EVALUATION RESULT |
|---|---|---|---|---|
| CAPTION 1 | – | – | – | – |
| SENTENCE 1-1 | ON | – | – | NON-PERFORMANCE FACTOR SENTENCE |
| SENTENCE 1-2 | ON | 80 | SENTENCE 1-3,SENTENCE 1-4,SENTENCE 1-8 | PERFORMANCE FACTOR SENTENCE |
| SENTENCE 1-3 | OFF | – | – | PERFORMANCE FACTOR SENTENCE |
| ⋮ | ⋮ | ⋮ | ⋮ | ⋮ |

SENTENCE EXTRACTION SYSTEM, SENTENCE EXTRACTION METHOD AND INFORMATION STORAGE MEDIUM

TECHNICAL FIELD

The present invention relates to a sentence extraction system, a sentence extraction method, and an information storage medium.

BACKGROUND ART

Conventionally, there has been discussed a technique for extracting at least one sentence from among a plurality of sentences. For example, Non-Patent Literature 1 describes a technique for extracting a performance factor sentence that describes a factor contributed to performance from documents such as company financial reports by determining the presence or absence of a company keyword in the respective sentences, determining whether the sentence leads to a key expression by following the modification relationship of the company keyword, and extracting a performance factor sentence.

CITATION LIST

Non-Patent Document

Non-Patent Literature 1: Artificial Intelligence Academy Journal Vol. 30, No. 1, pp. 172-182, 2015, Extraction of Performance Factors from Company Financial Report pdf, Hiroyuki Sakai, Yuko Nishizawa, Shogo Matsunami, Hiroki Sakaji.

SUMMARY OF THE INVENTION

Technical Problem

The technique described in Non-Patent Literature 1, however, focuses on each sentence in determination and does not take context into consideration. This cannot sufficiently enhance accuracy in sentence extraction. For example, a document may contain a sentence that does not contain either a company keyword or a key expression but describes a factor for performance if context is taken into consideration (for example, a sentence that cites a company keyword in its immediately preceding sentence by "it"). Such a sentence cannot be extracted according to the technique of Non-Patent Literature 1. On the other hand, for example, a document may contain a sentence that happens to lead to a key expression by following the modification relationship of a company keyword but has nothing to do with a factor for performance if context is taken into consideration (for example, a sentence describing the trend of the world economy). Such a sentence is extracted according to the technique of Non-Patent Literature 1, and turns out to be noise.

The present invention has been conceived in view of the above, and an object of the present invention is to provide a sentence extraction system, a sentence extraction method, and an information storage medium that can enhance accuracy in sentence extraction.

Solution to Problem

In order to achieve the above mentioned object, according to one aspect of the present invention, there is provided a sentence extraction system that includes at least one processor configured to: specify at least one candidate sentence based on a predetermined extraction condition, the candidate sentence being a candidate for a sentence to be extracted from among a plurality of sentences; specify at least one linked sentence that has a link to the at least one candidate sentence; and determine whether to extract the at least one linked sentence, based on whether to extract the at least one candidate sentence.

According to another aspect of the present invention, there is provided a method for extracting a sentence, the method including specifying at least one candidate sentence based on a predetermined extraction condition, the candidate sentence being a candidate for a sentence to be extracted from among a plurality of sentences; specifying at least one linked sentence that has a link to the at least one candidate sentence; and determining whether to extract the at least one linked sentence, based on whether to extract the at least one candidate sentence.

According to another aspect of the present invention, there is provided a non-transitory information storage medium storing a program for causing a computer to specify at least one candidate sentence based on a predetermined extraction condition, the candidate sentence being a candidate for a sentence to be extracted from among a plurality of sentences; to specify at least one linked sentence that has a link to the at least one candidate sentence; and to determine whether to extract the at least one linked sentence, based on whether to extract the at least one candidate sentence.

In one embodiment, the at least one processor may specify the at least one linked sentence among at least one non-candidate sentence that is a sentence not fulfilling the extraction condition, and determine to extract the at least one linked sentence.

In one embodiment, the at least one processor may obtain a score based on the extraction condition for every candidate sentence, and specify the at least one linked sentence that has a link to the at least one candidate sentence whose score fulfills a predetermined selection criterion.

In one embodiment, the selection criterion may is the order of the score, and the at least one processor may sequentially select a predetermined number of candidate sentences, beginning with a candidate sentence with a higher score, and specify the at least one linked sentence for every candidate sentence selected.

In one embodiment, the at least one processor may obtain a score based on the extraction condition for every candidate sentence, and change the at least one candidate sentence whose score fulfills a predetermined change criterion such that the at least one candidate sentence is not extracted.

In one embodiment, the at least one processor may specify at least one other candidate sentence that has a link to the at least one candidate sentence whose score fulfills the predetermined change criterion, as the at least one linked sentence, and determine not to extract the at least one linked sentence.

In one embodiment, the change criterion may is the order of the score, and the at least one processor may sequentially select a predetermined number of candidate sentences, beginning with a candidate sentence with a lower score, and change the predetermined number of candidate sentences selected such that these candidate sentences are not extracted.

In one embodiment, the score of at least one non-candidate sentence that does not fulfill the extraction condition among the plurality of sentences may be set to a predetermined value or not calculated.

In one embodiment, the at least one processor may restrain the at least one candidate sentence whose score fulfills a higher criterion than the change criterion from being determined as a sentence not to be extracted even though the at least one candidate sentence has a link to the at least one candidate sentence that fulfills the change criterion.

In one embodiment, a document containing the plurality of sentences may be divided into a plurality of parts, and the at least one processor may specify the at least one linked sentence for every part.

In one embodiment, the at least one processor may specify the at least one linked sentence, based on at least one of connection property, referential property, and vocabular link property with respect to the at least one candidate sentence.

In one embodiment, the extraction condition may indicate that at least one keyword among a plurality of keywords is contained, and the at least one processor may specify the at least one candidate sentence that contains the at least one keyword.

In one embodiment, each of the plurality of sentences may be related to content of a financial settlement of a company, and the extraction condition may be a condition for extracting a performance factor sentence that describes a factor for performance.

Effects of the Invention

According to the present invention, it is possible to enhance accuracy in sentence extraction.

BRIEF DESCRIPTION OF THE DRAWINGS

FIG. 2 illustrates one example of a financial report;
FIG. 6 illustrates exemplary data storage in a financial report database;
FIG. 7 illustrates exemplary data storage in a keyword database;
FIG. 8 illustrates exemplary data storage in evaluation result data.

DESCRIPTION OF EMBODIMENTS

1. Overall Structure of Sentence Extraction System

Figure 1:
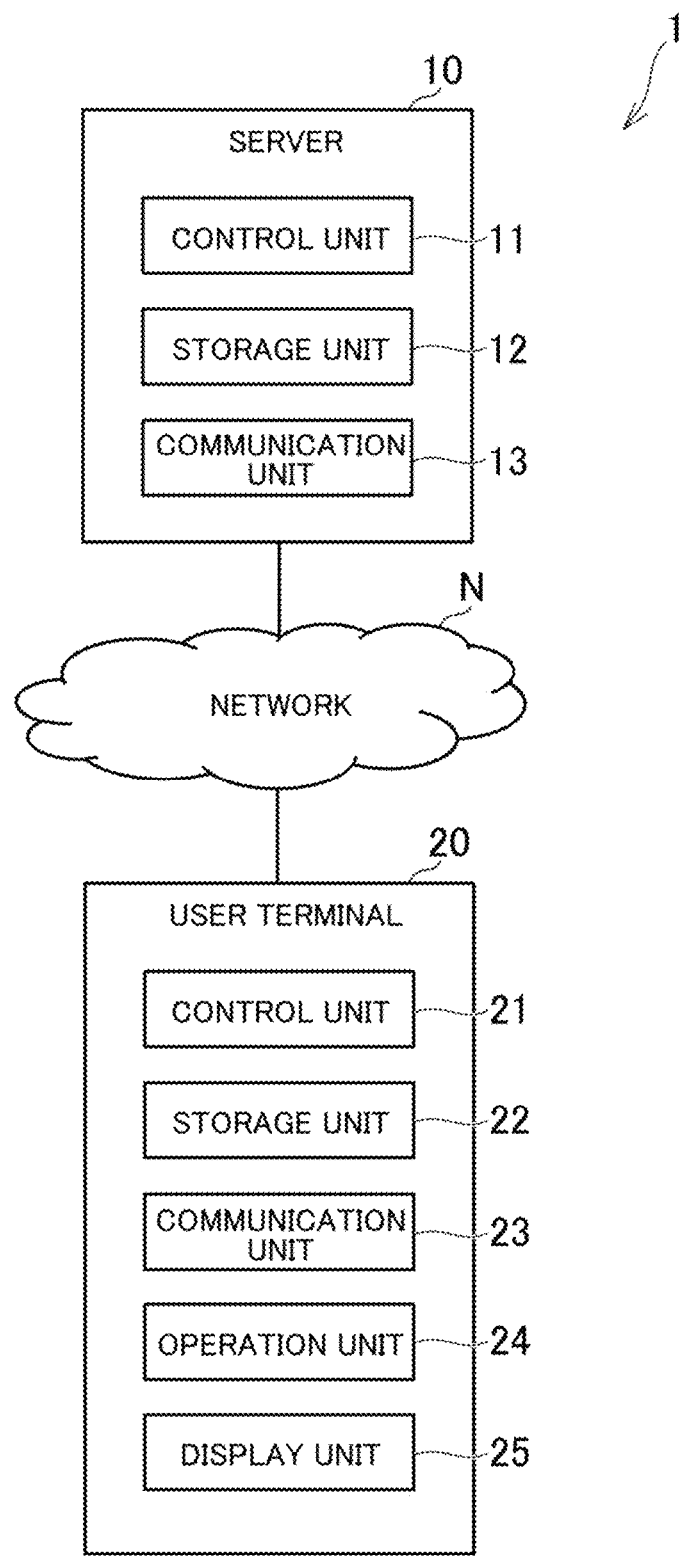
FIG. 1 illustrates the overall structure of a sentence extraction system.

An example of an embodiment of a sentence extraction system according to the present invention will now be described. FIG. 1 illustrates the overall structure of a sentence extraction system. As illustrated in FIG. 1, the sentence extraction system 1 includes a server 10 and a user terminal 20, which are connected to a network N, such as the Internet. Although one server 10 and one user terminal 20 are illustrated in FIG. 1, two or more servers 10 and two or more user terminals 20 may be provided.

The server 10 is a server computer and includes, for example, a control unit 11, a storage unit 12, and a communication unit 13. The control unit 11 includes at least one processor. The control unit 11 executes processing according to a program and data stored in the storage unit 12. The storage unit 12 includes a main storage unit and an auxiliary storage unit. For example, the main storage unit is a volatile memory, such as RAMS, while the auxiliary storage unit is a nonvolatile memory, such as hard disks or flash memories. The communication unit 13 includes a wired or wireless communication interface, and executes data communication via the network N, for example.

The user terminal 20 is a computer to be operated by a user, for example, including a personal computer, a personal digital assistant (including a tablet-type computer), or a portable phone (including a smartphone). The user terminal 20 includes a control unit 21, a storage unit 22, a communication unit 23, an operation unit 24, and a display unit 25. The hardware structures of the control unit 21, the storage unit 22, and the communication unit 23 may be similar to those of the control unit 11, the storage unit 12, and the communication unit 13, respectively. The operation unit 24 is an input device, for example, a pointing device, such as a touch panel or a mouse, or a keyboard. The operation unit 24 sends the content of a user operation to the control unit 21. The display unit 25 is, for example, a liquid crystal display or an organic EL display.

The program and data, described here as being stored in the storage units 12, 22, may be supplied via a network to these units. The respective hardware structures of the server 10 and the user terminal 20 are not limited to the above-described examples, and various hardware structures are applicable. For example, each of the server 10 and the user terminal 20 may include a reading unit (for example, an optical disk drive or a memory card slot) for reading a computer readable information storage medium or an input/output unit (for example, a USB terminal) for direct communication with external devices. In this case, the program and data stored in the information storage medium may be supplied via the reading unit or the input/output unit to each of the server 10 and the user terminal 20.

2. Outline of Sentence Extraction System

The sentence extraction system 1 extracts at least one sentence from among a plurality of sentences. A sentence is a series of words ended (segmented) with, for example, a "Kuten" (a Japanese delimiter), a period, an exclamation mark, or a question mark. A sentence can be written in any language, for example, English, Japanese, Chinese, Spanish, French, or Arabic.

In this embodiment, processing by the sentence extraction system 1 will be described referring to a case as an example in which at least one sentence is extracted from a company financial report. A sentence, however, is not limited to description of the content of financial settlements but may describe any other content. For example, the sentence extraction system 1 is applicable in any other cases where at least one sentence is extracted from, for example, news articles, editorials, theses, novels, posts on blogs or SNS, minutes, official documents, subtitle information for television or movies, or educational materials.

FIG. 2 illustrates one exemplary financial report. As illustrated in FIG. 2, a financial report F contains the content of a financial settlement of a company, and specifically contains, for example, sentences, captions, contents, figures, tables, and images. A financial report F can be written in any layout and, for example, prepared in any format in conformity with a predetermined rule. Although the report illustrated in FIG. 2 is not divided into pages for brevity of the description, actual financial reports F are divided into a plurality of pages.

Among the financial report F, some sentences are useful for users such as investors, and others are not. In view of the above, the sentence extraction system 1 in this embodiment extracts at least one performance factor sentence from a financial report F to provide users with useful knowledge.

A performance factor sentence is a sentence that describes a factor contributed to the performance of a company. In other words, a performance factor sentence is a sentence that describes a factor having an influence on at least one of the sales and profit of the company. A performance factor sentence can be rephrased as a sentence that makes reference material to be referred to in determining whether to invest in the company relevant to the financial report F.

For example, as a method for extracting a performance factor sentence, a method described in Non-Patent Literature 1, mentioned above in the related-art section, is available. As the method of Non-Patent Literature 1, however, determines a performance factor sentence in units of a sentence, as described above, accuracy in sentence extraction cannot be sufficiently enhanced. In contrast, the sentence extraction system 1 in this embodiment takes context in a financial report F into consideration to extract a performance factor sentence that cannot be extracted according to a conventional method and to exclude noise that can be erroneously extracted according to the conventional method, to thereby enhance accuracy in sentence extraction.

Figure 3:
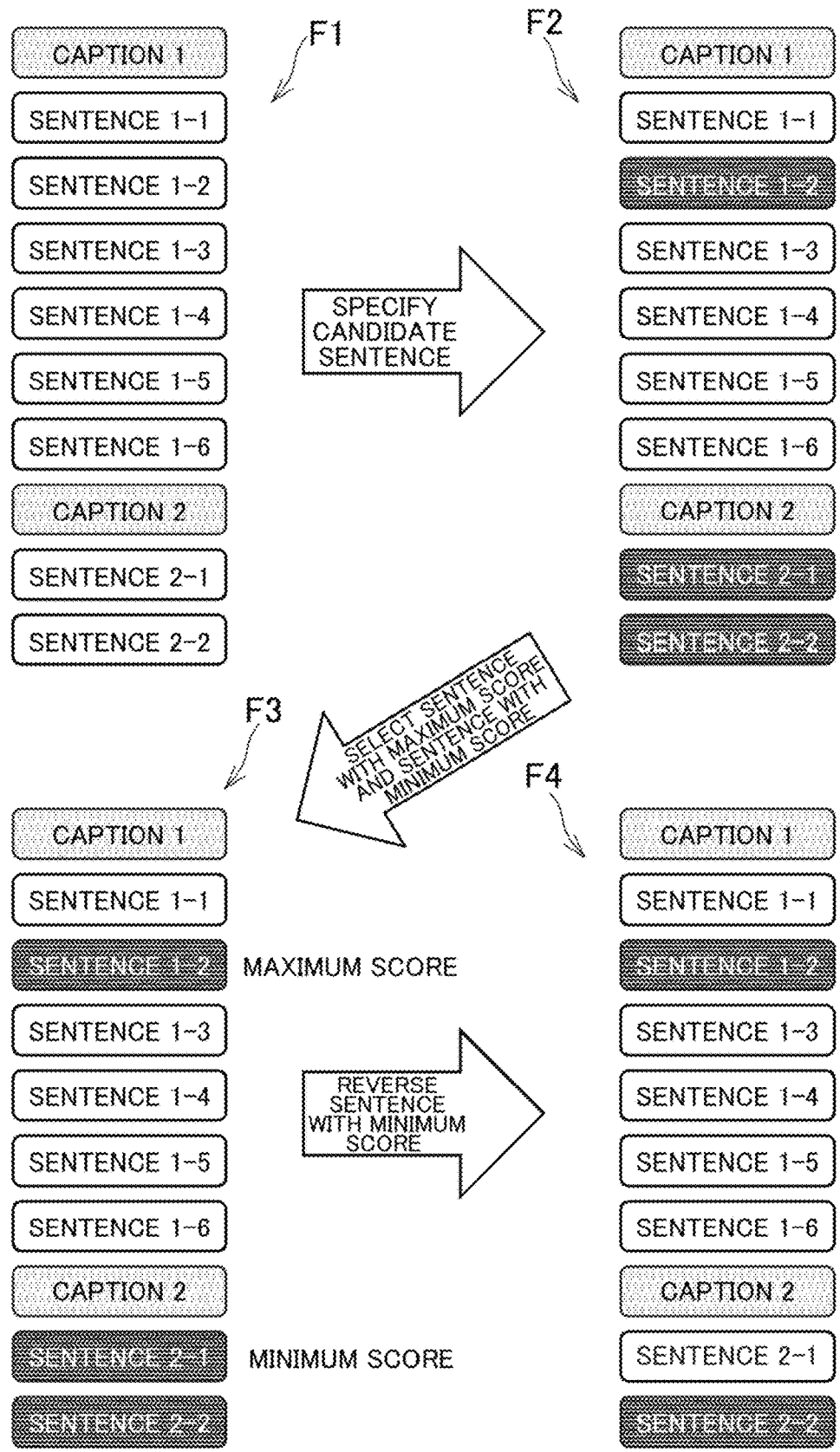
FIG. 3 outlines the processing to be executed by a sentence extraction system.
Figure 4:
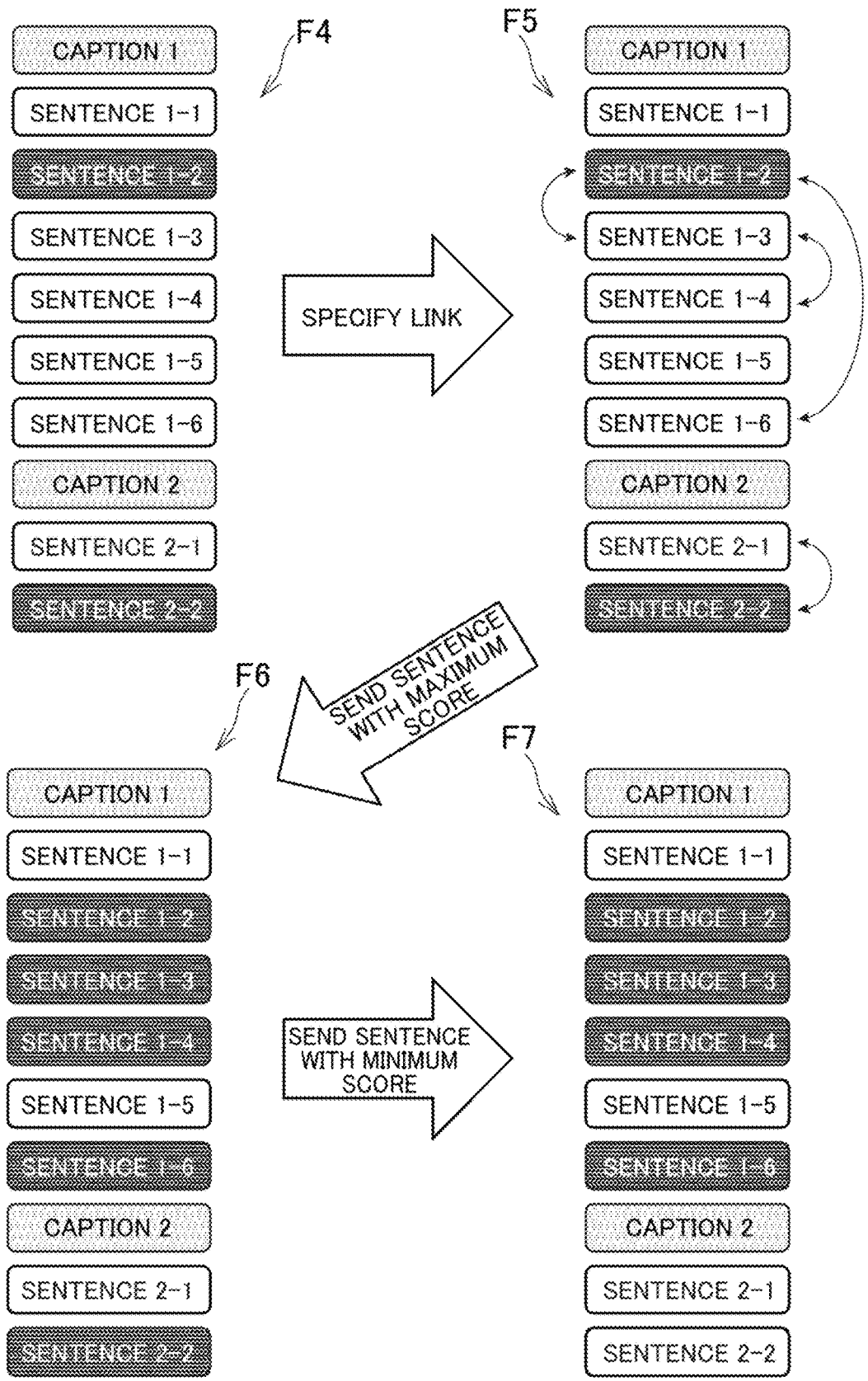
FIG. 4 outlines the processing to be executed by a sentence extraction system.

FIG. 3 and FIG. 4 outline the processing by the sentence extraction system 1, with captions and the content of sentences in the financial report F omitted for brevity of description. For example, "Caption 1" and "Caption 2" in FIG. 3 and FIG. 4 correspond to, for example, "(A) Domestic Operations" and "(B) Overseas Operations", respectively, in the financial report F in FIG. 2. Further, for example, "sentence 1-1" to "sentence 1-6" and "sentence 2-1" to "sentence 2-2" in FIG. 3 and FIG. 4 correspond to the sentences intervening between captions, such as "(A) Domestic Operations" and "(B) Overseas Operations" in the financial report F in FIG. 2.

As illustrated in FIG. 3, initially, the sentence extraction system 1 classifies the respective information items in the financial report F into captions and sentences (the state with the reference sign "F1"). As a classifying method into captions and sentences, any known methods are applicable. For example, the sentence extraction system 1 may specify a character string without a "Kuten" or a character string beginning with any specific word indicative of captions, such as (1) or (A), as a caption. Alternatively, for example, the sentence extraction system 1 may specify a part segmented by a "Kuten" or a period as a sentence, or may specify a part other than captions as sentences.

The sentence extraction system 1 specifies a sentence that is a candidate for a performance factor sentence, or a candidate sentence, among a plurality of sentences in the financial report F (the state with the reference sign "F2"). As a method for specifying candidate sentences, any known method is applicable. In this embodiment, a case in which the method of Non-Patent Literature 1 is used to specify a candidate sentence will be described. Note that a candidate sentence is extracted as a performance factor sentence according to the method of Non-Patent Literature 1. In this view, a candidate sentence can be rephrased as a sentence that is extracted as a performance factor sentence according to the method of Non-Patent Literature 1. In this embodiment, however, a candidate sentence may or may not be extracted as a performance factor sentence. In FIG. 3, candidate sentences are illustrated shadowed. For example, "sentence 1-2", "sentence 2-1", and "sentence 2-2" are specified as candidate sentences since these sentences contain company keywords and lead to key expressions by following the modification relationship of the company keywords.

The sentence extraction system 1 calculates the score of a candidate sentence, and selects a sentence with a maximum score and a sentence with a minimum score (the state with the reference sign "F3"). "A score" means the degree of reliance or accuracy in extracting sentences, and can be rephrased as a probability or likeliness that the sentence is a performance factor sentence. A method for calculating scores will be described later in detail. A higher score leads to a higher probability of the sentence's being a performance factor sentence, while a lower score leads to a lower probability. Specifically, in the example in FIG. 3, the "sentence 1-2" has a maximum score, while the "sentence 2-1" has a minimum score. No score is assumed to be calculated for a sentence that is not a candidate sentence (for example, the "sentence 1-1"), or a non-candidate sentence.

The sentence extraction system 1 reverses the evaluation of the "sentence 2-1" with a minimum score (the state with the reference sign "F4"). Note that the evaluation concerns whether the sentence should be extracted or not, and specifically indicates either a performance factor sentence or a non-performance factor sentence in this embodiment.

A non-performance factor sentence is a sentence that is not a performance factor sentence and that should not be extracted, while a performance factor sentence is a sentence that should be extracted. At the time when candidate sentences have just been specified (the state with the reference sign "F2"), all the candidate sentences are evaluated as performance factor sentences, while all non-candidate sentences as non-performance factor sentences. Again, a non-candidate sentence is a sentence that is not a candidate sentence, or a sentence other than candidate sentences. In the state with the reference sign "F4", the evaluation of the "sentence 2-1" with a minimum score, specified as a candidate sentence, is changed into an evaluation indicating a non-performance sentence as the probability of the sentence's being a performance factor sentence is lowest.

Referring to FIG. 4, the sentence extraction system 1 specifies a linked sentence, that has a link to the candidate sentence with a maximum score and a linked sentence having a link to the candidate sentence with a minimum score (the state with the reference sign "F5") for every segment. "A segment" refers to a part of a document, or a unit of significant collection of information items, corresponding to a part between one caption and its next caption in this embodiment.

"A link" means existence of a grammatical or vocabulary linkage between one sentence and another sentence, and can be rephrased as existence of relevance between one sentence and another sentence in terms of meaning or content. A linked sentence is a sentence that has a link to another sentence. Either of a candidate sentence and a non-candidate sentence can be a linked sentence. That is, a link can exist between a candidate sentence and a non-candidate sentence and between a candidate sentence and another candidate sentence. A method for specifying a linked sentence will be described later.

In the example in FIG. 4, the "sentence 1-3", "sentence 1-4", and "sentence 1-6" are specified as linked sentences that have a link to the candidate sentence with a maximum score, namely, the "sentence 1-2". Note that an indirect link can be found, like the "sentence 1-2" and "sentence 1-4", via the "sentence 1-3". In addition, the "sentence 2-2" is specified as a linked sentence having a link to the candidate sentence with a minimum score, or the "sentence 2-1".

The sentence extraction system 1 sends the evaluation of the candidate sentence with a maximum score to its linked sentence (the state with the reference sign "F6"). "To send" here means to add the evaluation of a candidate sentence to the evaluation of its linked sentence. As the evaluation of the candidate sentence with a maximum score indicates a performance factor sentence, the addition makes the evaluation of the linked sentence an evaluation indicating a performance factor sentence. In the example in FIG. 4, the evaluation of the "sentence 1-2", or the candidate sentence with a maximum score, is sent to the "sentence 1-3", "sentence 1-4", and "sentence 1-6", or its linked sentences, whereby the "sentence 1-3", "sentence 1-4", and "sentence 1-6", which are non-candidate sentences and thus non-performance factor sentences according to the technique of Non-Patent Literature 1, are turned out to be performance factor sentences and will be extracted in this embodiment because these sentences have a link to the "sentence 1-2".

In addition, the sentence extraction system 1 sends the evaluation of the candidate sentence with a minimum score to its linked sentence (the state with the reference sign "F7"). Since the evaluation of the candidate sentence with a minimum score has been changed so as to indicate a non-performance factor sentence, the addition makes the evaluation of the linked sentence an evaluation indicating a non-performance factor sentence. In the example in FIG. 4, the evaluation of the "sentence 2-1", or the candidate sentence with a minimum score, is sent to the "sentence 2-2", or its linked sentence, whereby the "sentence 2-2", which is a candidate sentence and thus a performance factor sentence according to the technique of Non-Patent Literature 1, turns out to be a non-performance factor sentence and will not be extracted in this embodiment because this sentence has a link to the "sentence 2-1" whose evaluation has been reversed.

The sentence extraction system 1 extracts a performance factor sentence, based on the final result of evaluation of each of the plurality of sentences contained in the financial report F. In the example in FIG. 4, in which the state with the reference sign "F7" corresponds to the final state, the "sentence 1-2", "sentence 1-3", "sentence 1-4", and "sentence 1-6" are extracted as performance factor sentences.

As described above, the sentence extraction system 1 in this embodiment makes a linked sentence having a link to a candidate sentence with a maximum score a performance factor sentence even if the linked sentence is not a candidate sentence. This enables extraction of a performance factor sentence that is not able to be extracted according to a conventional technique, like the "sentence 1-3", "sentence 1-4", and "sentence 1-6" in FIG. 3 and FIG. 4. This extraction enhances accuracy in sentence extraction.

For example, in the financial report F in FIG. 2, whereas the sentence "Profit from domestic operations increased from the corresponding period last year with decreased sales in canned products and increased sales in pre-packaged foods and seasonings" is extracted as a performance factor sentence according to the technique of Non-Patent Literature 1, the sentence "By items, profit from pre-packaged foods increased in curries and stews and decreased in baby foods" is not extracted as a performance factor sentence according to the technique of Non-Patent Literature 1 because expressions such as "increased" and "decreased" are not extracted as key expressions, though words such as "curries" and "stews" are extracted as company keywords. In contrast, the sentence extraction system 1 extracts the latter sentence, which is not extracted according to the technique of Non-Patent Literature 1, as a performance factor sentence by specifying a link between these sentences and sending the evaluation of the former sentence to the latter sentence.

In addition, the sentence extraction system 1 reverses the evaluation of a candidate sentence with a minimum score to make its linked sentence having a link to the candidate sentence a non-performance factor sentence even if the linked sentence is a candidate sentence. That is, a sentence, such as, the "sentence 2-1" and "sentence 2-2" in FIG. 3 and FIG. 4, that is extracted as a performance factor sentence (or a sentence that can be assumed as noise) according to a conventional technique is not extracted. This can enhance accuracy in sentence extraction.

For example, in the financial report F in FIG. 2, the sentences "Net asset increased by ¥5 million from the end of the previous consolidated fiscal year to ¥1 billion" and "This is mainly attributed to an increase of ¥7 million in retained earnings and a decrease of ¥2 million in foreign exchange conversion adjustment account" are extracted as performance factor sentences according to the technique of Non-Patent Literature 1. These sentences, however, do not describe any factor for the performance. Thus, these sentences are not performance factor sentences, but are assumed as noise. Regarding this point, the sentence extraction system 1 prevents extraction of these sentences as performance factor sentences by specifying the latter sentence as a sentence with the lowest score, then reversing the evaluation of the latter sentence, and sending the reversed evaluation to the former sentence. This can reduce noise.

As described above, the sentence extraction system 1 has a structure that extracts a performance factor sentence that cannot be extracted according to a conventional method and also prevents extraction of a non-performance factor sentence that is erroneously extracted according to the conventional method, to thereby enhance accuracy in sentence extraction. The structure of the sentence extraction system 1 will now be described in detail. Be noted that the reference signs for the financial report F will be thereafter omitted for brevity of description.

3. Functions Implemented in this Embodiment

Figure 5:
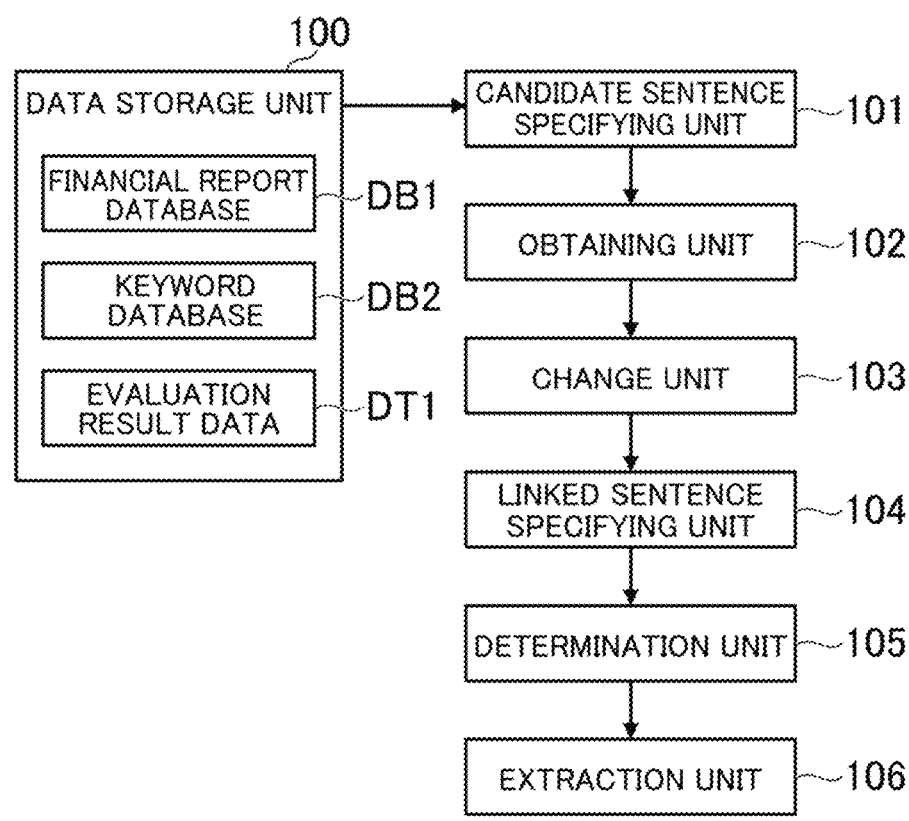
FIG. 5 is a functional block diagram illustrating exemplary functions implemented in a sentence extraction system.

FIG. 5 is a functional block diagram illustrating exemplary functions implemented in the sentence extraction system 1. As illustrated in FIG. 5, for example, a data storage unit 100, a candidate sentence specifying unit 101, an obtaining unit 102, a change unit 103, a linked sentence specifying unit 104, a determination unit 105, and an extraction unit 106 are implemented. In this embodiment, the respective functions are implemented in the server 10. In particular, the data storage unit 100 is implemented mainly using the storage unit 12, while the respective other functions are implemented mainly using the control unit 11.

[3-1. Data Storage Unit]

The data storage unit 100 stores data necessary for extracting sentences. For example, the data storage unit 100 stores a financial report database DB1, a keyword database DB2, and evaluation result data DT1.

FIG. 6 illustrates exemplary data storage in the financial report database DB1. As illustrated in FIG. 6, the financial report database DB1 is a database that stores information on financial reports, and, for example, stores the names and attributes of companies, links (paths) to the actual data on the financial reports, and performance factor sentences extracted by the extraction unit 106.

An attribute is information for classifying a company. For example, the attribute includes a business field with which the company is engaged, the category of a product dealt in by the company, and the category of a service provided by the company. In this embodiment, a company is assumed to belong to at least one of a plurality of attributes. A company, however, may not be classified particularly according to the attributes.

Actual data on a financial report can be prepared in any file format, for example, a text format, a document file format, an image file format, a graph format, or an HTML format. The actual data on a financial report is stored in the data storage unit 100, while a link to the location where the financial report is stored is stored in the financial report database DB1.

Actual data on a performance factor sentence may also be prepared in any file format. The actual data on a performance factor sentence can be phrased as a summary that is an excerpt of important parts from the financial report. The financial report database DB1 may store a performance factor sentence itself or a link to actual data that holds the performance factor sentence.

FIG. 7 illustrates exemplary data storage in the keyword database DB2. As illustrated in FIG. 7, the keyword database DB2 is a database that stores a keyword for specifying a candidate sentence. For example, the keyword database DB2 stores a company keyword and a key expression for every attribute.

A company keyword is an important keyword for a company. For example, company keywords include, for example, a keyword relevant to the business field of the company, a keyword relevant to a product dealt in by the company, and a keyword relevant to a service provided by the company. The exemplary data storage in FIG. 7 contains keywords, such as "bonitos", "mackerels", and "fish catch", relevant to the fishery processing industry, with respect to the attribute of fishery processing.

A key expression is an expression that makes a clue to whether the performance is good or bad. For example, key expressions include predictions and adjectives such as "very good", "good", "bad", and "worsen". In the exemplary data storage in FIG. 7, key expressions, such as "was very good", "was good", and "was bad", that provide a clue to whether the performance of the fishery processing is good or bad are associated with the attribute of fishery processing. A key expression can be rephrased as an example of a keyword for sentence extraction as the key expression contains a word such as "very good".

The company keywords and key expressions can be manually inputted by the administrator of the sentence extraction system 1. In this embodiment, the company keywords and key expressions are assumed to be prepared, for example, by statistically analyzing and extracting words that appear in financial reports or performance reporting articles. For example, the server 10 calculates W(n, F(t)) in Expression 1 with respect to a noun n that appears in the financial reports of a certain company t, in order to collect company keywords.

$$W(n, F(t)) = H(n, F(t))TF(n, F(t))\log_2 \frac{N}{df(n)}$$ [Expression 1]

F(t) is a set of financial reports f of the company t. As the company t regularly issues the latest financial report f, F(t) can be phrased as the history of the financial reports f issued by the company t. F(t) may be a set of financial reports f that have been issued during the whole past period or a predetermined immediate past period.

W(n, F(t)) is an evaluation value to be referred to in determining whether the noun n in F(t), in a set of financial reports, is a company keyword. For example, W(n, F(t)) is stored in the keyword database DB2. Meanwhile, H(n, F(t)) is an entropy of the probability of appearance of the noun n in the financial reports f within f∈F(t). TF(n, F(t)) is a tf–idf value in a case that all documents in F(t) are assumed to be integrated as one. Note that consideration of only one of the entropy of probability and the tf–idf value is acceptable.

The value of Expression 1 takes a higher value with respect to a noun that often and uniformly appears throughout the financial report of a certain company but does not appear in the financial reports of other companies. For example, the server 10 averages W(n, F(t)) for the company t, and extracts a noun with W(n, F(t)) larger than the average and $\log_2(N/df(n))$ larger than one as a company keyword.

Similar to the company keyword, a key expression may also be extracted, based on statistical information. Alternatively, a key expression may be manually inputted by the administrator of the sentence extraction system 1. Although a case in which a company keyword and a key expression are prepared for every company attribute is described in this embodiment, a company keyword and a key expression can be prepared for every company. Alternatively, a company keyword and a key expression common to all target companies may be prepared, rather than preparing a company keyword and a key expression for every attribute or company.

FIG. 8 illustrates exemplary data storage in the evaluation result data DT1. As illustrated in FIG. 8, the evaluation result data DT1 is data that holds evaluations of the sentences contained in a financial report. For example, the evaluation result data DT1 holds a candidate sentence flag, a score, linked sentence information, and the result of evaluation for every sentence in a financial report. Information on captions, held in the exemplary data storage in FIG. 8, is omissible.

A candidate sentence flag is information indicating whether the sentence is a candidate sentence. For example, a sentence with the candidate sentence flag in an on state is a sentence specified as a candidate sentence, while a sentence with the candidate sentence flag in an off state is a sentence not specified as a candidate sentence. In this embodiment, a score is calculated only with respect to a sentence with the candidate sentence flag in an on state, and held in the evaluation result data DT1.

Linked sentence information indicates a sentence that is specified as a linked sentence. In this embodiment, in which linked sentences are specified with respect to a candidate sentence with a maximum score and with respect to a candidate sentence with a minimum score, respectively, linked sentence information is held for these two sentences only. The result of evaluation indicates whether the sentence should be extracted or not. In this embodiment, either a value indicating a performance factor sentence or a value indicating a non-performance factor sentence is held as the result of evaluation.

[3-2. Candidate Sentence Specifying Unit]

The candidate sentence specifying unit 101 specifies at least one candidate sentence, or a candidate for a sentence to be extracted from among a plurality of sentences, based on a predetermined extraction condition.

An extraction condition is a condition for extracting a sentence, and can be rephrased as a condition for preparing a summary, and further as a condition contained in a sentence extraction rule or an automatic summary algorithm. As an extraction condition, any condition can be set, including, for example, conditions related to the presence/absence of a predetermined keyword, to the range of an evaluation value associated with a keyword, and to the range of the characteristic amount of a word in a sentence. In this embodiment, an extraction condition is a condition that can be determined in units of a sentence, though any condition that requires consideration of context can be set.

In this embodiment, in which the plurality of respective sentences concern the content of a company's financial settlement, an extraction condition is a condition for extracting a performance factor sentence that describes a factor for performance. As an exemplary extraction condition, the method of Non-Patent Literature 1 will be described in this embodiment, as mentioned earlier, though various conditions that are used in preparing summaries can be used as the extraction condition.

The candidate sentence specifying unit 101 determines whether each of the plurality of sentences contained in a financial report fulfills the extraction condition. In other words, the candidate sentence specifying unit 101 determines, for every sentence, whether the extraction condition is fulfilled. Specifically, the candidate sentence specifying unit 101 specifies at least one sentence that fulfills the extraction condition as a candidate sentence. That is, the candidate sentence specifying unit 101 does not specify a sentence that does not fulfill the extraction condition as a candidate sentence, but specifies a sentence that fulfills the extraction condition as a candidate sentence. The result of processing by the candidate sentence specifying unit 101 is held in the evaluation result data DT1. The candidate sentence flag of a candidate sentence is turned on, while that of a non-candidate sentence is turned off.

In this embodiment, all the plurality of sentences contained in a financial report are targets of the processing by the candidate sentence specifying unit 101, though only some of such sentences may be the targets. These target sentences for the processing are not necessarily contained all in one data, but may be specified among sentences in two or more data. Further, for example, the candidate sentence specifying unit 101 may specify only one candidate sentence or two or more candidate sentences. Further, for example, the candidate sentence specifying unit 101 may specify all sentences that fulfill the extraction condition as candidate sentences, or may specify only some of such sentences as candidate sentences. The upper limit in the number of sentences to be specified as a candidate sentence may or may not be determined.

In this embodiment, as the extraction condition indicates that the sentence contains at least one of a plurality of keywords, the candidate sentence specifying unit 101 specifies at least one candidate sentence that contains at least one keyword. The candidate sentence specifying unit 101 determines, for every sentence, whether the sentence contains a keyword stored in the keyword database DB2. Specifically, the candidate sentence specifying unit 101 specifies a sentence that contains a keyword as a candidate sentence, but does not specify a sentence not containing a keyword as a candidate sentence.

Specifically, according to the method of Non-Patent Literature 1 as an example, the candidate sentence specifying unit 101 determines, for every sentence, whether the sentence contains a company keyword, then determines whether a clause in the sentence containing the company keyword leads to a key expression by following the modification relationship of the clause, and specifies a sentence determined as leading to a key expression (a performance factor sentence according to the method of Non-Patent Literature 1) as a candidate sentence. That is, the extraction condition in this embodiment indicates that the sentence contains a company keyword and leads to a key expression by following the modification relationship of a clause in the sentence.

For example, assuming that a sentence "The fish catch of bonitos and mackerels was very good" is contained in a financial report. In this case, the candidate sentence specifying unit 101 can reach a key expression "was very good" by following the modification relationship of a clause containing company keywords, such as "bonitos", "mackerels", and "fish catch", and thus specifies this sentence as a candidate sentence. On the other hand, the candidate sentence specifying unit 101 does not specify either a sentence that does not contain a company keyword or a sentence that contains a company keyword but does not lead to a key expression as a candidate sentence.

[3-3. Obtaining Unit]

The obtaining unit 102 obtains a score for every candidate sentence based on the extraction condition. Specifically, a score can be calculated with a calculation expression that is assumed to be stored in advance in the data storage unit 100. The calculation expression can be phrased as a formula that defines the relationship between a candidate sentence and a score. When the entirety or a part of a candidate sentence is inputted into the calculation expression, a score is outputted.

For example, a higher degree of matching between a candidate sentence and the extraction condition leads to a higher score, and a lower degree of the matching leads to a lower score. For example, a larger number of keywords contained in a candidate sentence leads to a higher score, and a smaller number of the keywords leads to a lower score. For example, a higher evaluation value of a keyword contained in a candidate sentence leads to a higher score, and a lower evaluation value of a keyword contained in a candidate sentence leads to a lower score.

In this embodiment, a case in which the obtaining unit 102 obtains a score, based on the evaluation value of a keyword contained in a candidate sentence will be described. Specifically, $W(n, F(t))$ in Expression 1 is described here as one example of the evaluation value. The evaluation value, however, can be calculated with other methods. For example, the frequency of appearance of a keyword or a tf–idf value itself can be used as an evaluation value. Alternatively, for example, an evaluation value may be manually designated by the administrator of the sentence extraction system 1, rather than being statistically calculated. For example, the obtaining unit 102 obtains the score of a candidate sentence, for example, based on the evaluation value of a keyword in a candidate sentence and Expression 2 below.

$$conf(t, f, i) = \frac{1}{|K(t, f, i)|} \sum_{n \in K(t,f,i)} W(n, F(t)) \quad \text{[Expression 2]}$$

Conf(t, f, i) is the score of a candidate sentence $s_i$ in the $i^{th}$ line in a financial report $f \in F(t)$ of a company t. $K(t, f, i)$ is a set of company keywords in the candidate sentence $s_i$ in the $i^{th}$ line, the company keywords leading to a key expression by following the modification relationship of the keywords. Conf(t, f, i) takes a higher value when W(n, F(t)) has a higher value with respect to all n's that fulfill n∈K.

In this embodiment, in which a candidate sentence with a maximum score and a candidate sentence with a minimum score are selected, a line number M(t, f) with a maximum score and a line number L (t, f) with a minimum score are obtained, based on conf(t, f, i), as indicated by Expressions 3 and 4 below.

$$M(t, f) = \mathrm{argmax}_i conf(t, f, i) \quad \text{[Expression 3]}$$

$$L(t, f) = \mathrm{argmin}_i conf(t, f, i) \quad \text{[Expression 4]}$$

In this embodiment, at least one candidate sentence that fulfills the extraction condition among the sentences contained in a financial report is a target of score calculation, and no score is calculated for at least one non-candidate sentence that does not fulfill the extraction condition. Hence, the obtaining unit 102 does not calculate a score of a non-candidate sentence, so that no score will be held in the evaluation result data DT1 with respect to a non-candidate sentence.

Alternatively, the score of a non-candidate sentence may be set to a predetermined value (a fixed value), rather than not being calculated. This value is smaller than the score of a candidate sentence, for example, zero. That is, calculation of the score of a non-candidate sentence based on Expression 2 ends up with zero due to absence of an evaluation value W(n, F(t)) in the first place due to absence of a company keyword in the no-candidate sentence. That is, the score of non-candidate sentences can be a value common to any non-candidate sentences.

[3-4. Change Unit]

The change unit 103 changes at least one candidate sentence whose score fulfills a predetermined change criterion such that the at least one candidate sentence is not extracted. A change criterion is a criterion for changing the evaluation of a candidate sentence, specifically, indicating that the score is relatively low. Examples of the change criterion include that the order of the score is less than a predetermined order, that the score is less than a threshold, and that the score corresponds to a predetermined lower percentage.

Based on the respective scores of at least one candidate sentence, the change unit 103 specifies a candidate sentence that fulfills the change criterion. The change unit 103 changes the evaluation of a candidate sentence that fulfills the change criterion, and does not change the evaluation of a candidate sentence that does not fulfill the change criterion. The change unit 103 may change the evaluations of all candidate sentences that fulfill the change criterion. Alternatively, the upper limit in the number of candidate sentences whose evaluations are to be changed may be determined in advance, and the change unit 103 may change the evaluations of only some of the candidate sentences that fulfill the change criterion.

In this embodiment, the change criterion concerns the order of a score. Accordingly, the change unit 103 sequentially selects a predetermined number of candidate sentences, beginning with one with a lower score, and changes the predetermined number of selected candidate sentences such that these candidate sentences selected are not extracted. The number of candidate sentences to be selected (that is, the predetermined number mentioned above) can be any number, which is one in this embodiment, though the number can be two or more. Alternatively, the number may be a fixed number or a variable number. For example, the change unit 103 specifies a sentence $s_L$ with a minimum score among the candidate sentences, and changes the result of evaluation of the sentence $s_L$ from an evaluation indicating a performance factor sentence to an evaluation indicating a non-performance factor sentence, the result of evaluation being stored in the evaluation result data DT1. That is, the change unit 103 changes the result of evaluation of the sentence $s_L$ from an evaluation indicating that the sentence should be extracted to an evaluation indicating that the sentence should not be extracted.

[3-5. Linked Sentence Specifying Unit]

The linked sentence specifying unit 104 specifies at least one linked sentence that has a link to at least one candidate sentence. Specifically, the linked sentence specifying unit 104 may determine whether a candidate sentence has a linked sentence (which will be hereinafter referred to as a link determination) with respect to all candidate sentences specified or with respect to only some candidate sentences. In this embodiment, a case will be described in which the linked sentence specifying unit 104 makes a link determination with respect to at least one candidate sentence having a score fulfilling a predetermined selection criterion, rather than with respect to all the candidate sentences specified, to specify at least one linked sentence having a link to the at least one candidate sentence.

The selection criterion is a criterion for selecting a candidate sentence for which a link determination is to be made. In other words, a selection criterion is a criterion for selecting a candidate sentence whose evaluation is to be sent. Examples of the selection criterion include that the order of the score is a predetermined order or higher, that the order of the score is less than a predetermined order, that the score is equal to a threshold or higher, that the score is less than a threshold, that the score corresponds to a predetermined top percentage, and that the score corresponds to a predetermined lower percentage. The linked sentence specifying unit 104 may make a link determination with respect to all candidate sentences that fulfill the selection criterion. Alternatively, the upper limit in the number of candidate sentences for which a link determination is to be made may be determined in advance, so that the linked sentence specifying unit 104 makes a link determination with respect to only some candidate sentences that fulfill the selection criterion.

In this embodiment, the selection criterion concerns the order of a score. For example, the linked sentence specifying unit 104 sequentially selects a predetermined number of candidate sentences, beginning with one having a higher score, for example, and specifies at least one linked sentence for every selected candidate sentence. The number of candidate sentences to be selected (that is, the predetermined number mentioned above) may be any number, which is one in this embodiment, though the number can be two or more. Alternatively, the number can be a fixed number or a variable number. For example, the linked sentence specifying unit 104 selects a sentence $s_M$ with a maximum score from among the candidate sentences, and makes a link determination with respect to the sentence $s_M$.

Note that the linked sentence specifying unit 104 may find a linked sentence of a certain candidate sentence from among other candidate sentences or non-candidate sentences. Since the evaluation of a candidate sentence that is a performance factor sentence is sent to a non-candidate sentence that is a non-performance factor sentence, the linked sentence specifying unit 104 finds a linked sentence of a certain candidate sentence among non-candidate sentences. For example, the linked sentence specifying unit 104 specifies at least one linked sentence among at least one non-candidate sentence, or a sentence that does not fulfill the extraction condition. The linked sentence specifying unit 104 specifies at least one linked sentence that has a link to a sentence $s_M$ with a maximum score among non-candidate sentences.

For example, the linked sentence specifying unit 104 selects a sentence $s_L$ with a minimum score from among the candidate sentences, and determines if there is a linked sentence of that sentence $s_L$ among the remaining candidate sentences. In this embodiment, the evaluation of a sentence $s_L$ with a minimum score is reversed (that is, being reversed into an evaluation indicating a non-performance factor sentence) before being sent. The linked sentence specifying unit 104 finds a linked sentence of the sentence $s_L$ with a minimum score among other candidate sentences. That is, the linked sentence specifying unit 104 specifies at least one other candidate sentence having a link to at least one candidate sentence with a score fulfilling the change criterion as at least one linked sentence.

In this embodiment, a document containing a plurality of sentences is divided into a plurality of parts, and the linked sentence specifying unit 104 specifies at least one linked sentence for every part. In this embodiment, the part corresponds to a segment, though the segment is not essential. Alternatively, the linked sentence specifying unit 104 may specify a linked sentence for every page or for every paragraph, for example. Still alternatively, the linked sentence specifying unit 104 may specify a linked sentence for every range selected by an administrator, for example.

As a method for making a link determination, various known methods are applicable. In the case that a link is found between a candidate sentence and a non-candidate sentence, the linked sentence specifying unit 104 specifies the non-candidate sentence as a linked sentence. For example, in the case that a link is found between a candidate sentence and another candidate sentence, the other candidate sentence is specified as a linked sentence. For example, the linked sentence specifying unit 104 specifies at least one linked sentence, based on at least one of the connection property, referential property, and vocabular link property with respect to at least one candidate sentence. In this embodiment, a case in which a linked sentence is specified, based on all the connection property, the referential property, and the vocabular link property will be described, though a linked sentence can be specified, based on any one or two of these properties.

The connection property relates to the presence/absence of a conjunction or an adverb. For example, when a conjunction such as "also", "then", or "on the other hand", or an adverb such as "particularly" appears at the beginning or in the middle of a sentence, it is determined that there is a link. The referential property relates to the presence/absence of a pronoun. For example, when a pronoun such as "this" or "that" appears at the beginning or in the middle of a sentence, it is determined that there is a link. The vocabular link property relates to the presence/absence of a common word. For example, when a predetermined word is commonly used, it is determined that there is a link.

For example, in connection with the connection property and referential property, the linked sentence specifying unit 104 determine if there is a link between adjacent sentences, following the procedure below. Although a linked sentence of a sentence $s_L$ with the lowest score is referred to as an example below, the same processing is conducted with respect to a linked sentence of a sentence $s_M$ with the highest score.

(Procedure 1) i=L−1, j=L+1 (i and j are variables, L is the line number of a sentence $s_L$ with the lowest score)
(Procedure 2) If $s_i$ is a caption, go to Procedure 5.
(Procedure 3) If there is a conjunction or an adverb at the beginning of the sentence $s_i$, determine there is a link between $s_i$ and $s_{i+1}$, and if not, go to Procedure 5.
(Procedure 4) Deduct one from i, and go to Procedure 2.
(Procedure 5) If $s_j$ is a caption, end the processing.
(Procedure 6) If there is a conjunction or an adverb at the beginning of the sentence $s_j$, determine there is a link between $s_j$ and $s_{j-1}$, and if not, end the processing.
(Procedure 7) Increase j by one, and go to Procedure 5.

For example, in connection with the vocabular link property, the linked sentence specifying unit 104 specifies a linked sentence, focusing on a common use of a word between sentences. Specifically, in general, a sentence is divided into a subject-matter part that describes a subject-matter and a non-subject-matter part, or the rest of the sentence. In this embodiment, a clause that contains a predetermined word such as "in" or "as to" is determined as a subject-matter part, and the remaining part as a non-subject-matter part. If there is a word commonly used in the respective subject-matter parts of two sentences, it is highly likely that these sentences are related to similar subjects. Hence, the result of extraction for one sentence is expected to depend on the result of extraction for the other. This is applicable to a case where a word is commonly used in the subject-matter part and in the non-subject-matter part of two respective sentences because it is likely that the same subject matter is being elaborated.

As described above, in the case that at least one noun morpheme in a set of noun morphemes contained in the main-subject part of a candidate sentence $s_M$ with a maximum score is commonly contained in a set of noun morphemes contained in the main-subject part of any sentence in the same segment, it is determined that there is a link between these sentences. This is similarly applicable to a candidate sentence $s_L$ with a minimum score.

For example, in the example in FIG. 2, as the noun "pre-packed foods" is commonly used in the sentence "Profit from domestic operations increased from the corresponding period last year, with decreased sales in canned products and increased sales in pre-packaged foods and seasonings" and the sentence "As segment information, profit from pre-packaged foods increased in curries and stews, and decreased in baby foods", it is determined that these sentences have a link to each other.

Note that it is possible that a candidate sentence has no sentence that has a link to that candidate sentence. Hence, a linked sentence may not be always available, and thus the evaluation of a candidate sentence may not be always sent. On the other hand, it is possible that a candidate sentence has two or more sentences that have a link to the candidate sentence. Thus, two or more linked sentences may be specified in some cases, and thus the evaluation of a candidate sentence can be sent to two or more linked sentences in some cases. The linked sentence specifying unit 104 may specify an unlimited number of linked sentences provided that the sentences have a link, or may specify linked sentences up to the upper limit.

[3-6. Determination Unit]

The determination unit 105 determines whether to extract at least one linked sentence, based on whether to extract at least one candidate sentence. The determination unit 105 determines the evaluation of a linked sentence such that the evaluation is the same as the evaluation of a candidate sentence. In other words, the determination unit 105 matches the evaluation of a candidate sentence and the evaluation of a linked sentence that has a link to the candidate sentence. The result of determination by the determination unit 105 is held in the evaluation result data DT1.

For example, in the case that at least one linked sentence having a link to a candidate sentence to be extracted is specified, the determination unit 105 determines to extract the at least one linked sentence. For example, in the case that the evaluation of a candidate sentence indicates a performance factor sentence, the determination unit 105 determines to make the evaluation of a linked sentence having a link to that candidate sentence an evaluation indicating a performance factor sentence. Specifically, in this embodiment, the determination unit 105 changes the evaluation of a non-candidate sentence having a link to a sentence $s_M$ with a maximum score from an evaluation indicating a non-performance factor sentence to an evaluation indicating a performance factor sentence.

In addition, for example, the determination unit 105 determines not to extract at least one linked sentence that has a link to a candidate sentence not to be extracted. Also, for example, in the case that the evaluation of a candidate sentence indicates a non-performance factor sentence, the determination unit 105 determines to make the evaluation of a linked sentence that has a link to that candidate sentence an evaluation indicating a non-performance factor sentence. Specifically, in this embodiment, the determination unit 105 changes the evaluation of a candidate sentence that has a link to a sentence $s_L$ with the lowest score from an evaluation indicating a performance factor sentence to an evaluation indicating a non-performance factor sentence.

[3-7. Extraction Unit]

The extraction unit 106 extracts at least one sentence from among a plurality of sentences, based on the result of determination by the determination unit 105. For example, the extraction unit 106 extracts a linked sentence which has been determined by the determination unit 105 to be extracted, and does not extract a linked sentence which has been determined by the determination unit 105 not to be extracted. Referring to the evaluation result data DT1, the extraction unit 106 extracts a sentence having a result of evaluation indicating a performance factor sentence, and does not extract a sentence having the result of evaluation indicating a non-performance factor sentence.

Note that the extraction unit 106 may extract all sentences having the results of evaluation indicating a performance factor sentence or may extract only some of such sentences. For example, the upper limit in the number of sentences to be extracted by the extraction unit 106 may be set. In this case, the extraction unit 106 may determine a sentence to be extracted, based on the score. The extraction unit 106 stores the performance factor sentence extracted from a financial report, in the financial report database DB1.

4. Processing to be Executed in this Embodiment

Figure 9:
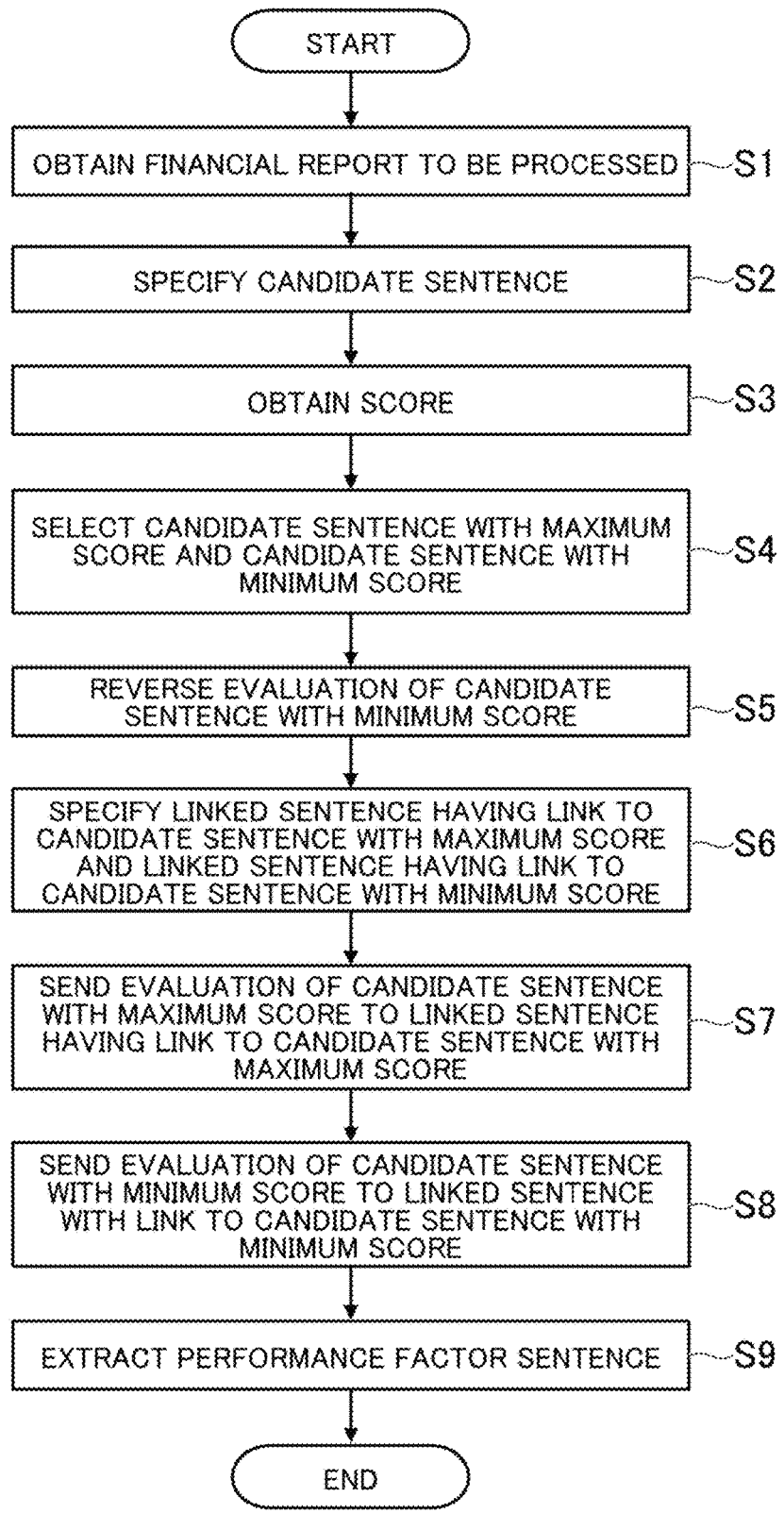
FIG. 9 is a flowchart of the processing to be executed by a server.

FIG. 9 is a flowchart of the processing to be executed by the server 10. The processing illustrated in FIG. 9 is executed by the control unit 11 by operating based on the program stored in the storage unit 12. The processing illustrated in FIG. 9 is one example of the processing to be executed by the function blocks illustrated in FIG. 5.

As illustrated in FIG. 9, the control unit 11 obtains a financial report to be processed, referring to the financial report database DB1 (S1). At S1, the control unit 11 determines any of the financial reports from which no performance factor sentence has been extracted yet among those stored in the financial report database DB1, as a target of the processing.

The control unit 11 specifies at least one candidate sentence among a plurality of sentences contained in the financial report, based on the extraction condition (S2). At S2, the control unit 11 specifies a sentence that contains a company keyword and leads to a key expression by following the modification relationship of the company keyword, as a candidate sentence, based on the keyword database DB2.

The control unit 11 obtains a score for every candidate sentence specified at S2 (S3). At S3, the control unit 11 calculates the score of each candidate sentence, based on Expression 2, and stores the calculated score in the evaluation result data DT1.

The control unit 11 selects a candidate sentence $s_M$ with a maximum score and a candidate sentence $s_L$ with a minimum score from among the candidate sentences specified at S2 (S4). If there are two or more sentences with a maximum score (if there are two or more sentences at the first order), all these sentences may be selected or any one of these sentences may be selected. This is similarly applicable to the sentence with a minimum score.

The control unit 11 reverses the evaluation of the candidate sentence $s_L$ with a minimum score (S5). At S5, the control unit 11 changes the evaluation of the candidate sentence $s_L$ from an evaluation indicating a performance factor sentence to an evaluation indicating a non-performance factor sentence.

The control unit 11 specifies a linked sentence that has a link to the candidate sentence $s_M$ with a maximum score and a linked sentence that has a link to the candidate sentence $s_L$ with a minimum score for every segment (S6). At S6, the control unit 11 specifies a linked sentence among the sentences intervening between the caption above the candidate sentence $s_M$ with a maximum score and the caption below. Further, the control unit 11 specifies a linked sentence among the sentences intervening between the caption above the candidate sentence $s_L$ with a minimum score and the caption below.

The control unit 11 sends the evaluation of the candidate sentence $s_M$ with a maximum score to its linked sentence that has a link to the candidate sentence $s_M$ with a maximum score (S7). At S7, the control unit 11 changes the evaluation of the non-candidate sentence specified as a linked sentence from an evaluation indicating a non-performance factor sentence to an evaluation indicating a performance factor sentence.

The control unit 11 sends the evaluation of the candidate sentence with a minimum score to its linked sentence that has a link to the candidate sentence $s_L$ with a minimum score (S8). At S8, the control unit 11 changes the evaluation of the candidate sentence specified as a linked sentence from an evaluation indicating a performance factor sentence to an evaluation indicating a non-performance factor sentence.

The control unit 11 extracts a performance factor sentence from the financial report, based on the evaluation result data DT1 (S9), and ends this processing. At S9, the control unit 11 extracts a sentence with the result of evaluation indicating a performance factor sentence, and stores the sentence in the financial report database DB1, the result of evaluation being stored in the evaluation result data DT1.

According to the above-described sentence extraction system 1, at least one linked sentence that has a link to at least one candidate sentence is specified, and whether to extract the at least one linked sentence is determined based on whether to extract the at least one candidate sentence. This makes the sentence extraction system 1 extract a sentence while taking context into consideration, rather than while determining in units of a sentence whether the sentence fulfills the extraction condition. This can enhance accuracy in sentence extraction.

In addition, the sentence extraction system 1 specifies at least one linked sentence among at least one non-candidate sentence that does not fulfill the extraction condition, and determines to extract the at least one linked sentence specified. Note that there is a case, for example, in which a sentence that does not fulfill the extraction condition can turn out to be a sentence that should be extracted if context is taken into consideration. Hence, extraction of a linked sentence having a link to a candidate sentence to be extracted makes it possible to prevent omission of extraction of such a sentence. With the omission prevented, an increased number of sentences can be extracted, and further, deterioration in accuracy in sentence extraction due to omission of extraction of an important sentence can be prevented.

In addition, the sentence extraction system 1 specifies at least one linked sentence that has a link to at least one candidate sentence whose score, obtained for every candidate sentence, fulfills a predetermined selection criterion. For example, specifying linked sentences of all candidate sentences leads to specifying a linked sentence of a relatively unimportant candidate sentence having a relatively low score. This can deteriorate accuracy in sentence extraction. In contrast, specifying a linked sentence of only a candidate sentence that fulfills the selection criterion makes it possible to specify a linked sentence of a more important candidate sentence. This can prevent deterioration in accuracy in sentence extraction.

In addition, the sentence extraction system 1 sequentially selects a predetermined number of candidate sentences, beginning with one with a higher score, and specifies at least one linked sentence for every selected candidate sentence. The predetermined number of candidate sentences having been sequentially selected in the order of a higher score are more important sentences among the candidate sentences. Specifying a linked sentence of such an important candidate sentence makes it possible to more efficiently prevent deterioration in accuracy in sentence extraction.

In addition, the sentence extraction system 1 changes at least one candidate sentence having a score fulfilling a predetermined change criterion such that the at least one candidate sentence is not extracted. For example, a candidate sentence with a relatively low score is not as important as other candidate sentences even if the candidate sentence fulfills the extraction information for the meantime. Thus, arranging such that such a sentence is not extracted enables efficient enhancement of accuracy in sentence extraction. For example, extraction of too many sentences leads to deterioration in accuracy as the accuracy is averaged as a whole. In contrast, limiting a target of extraction to only an important sentence can enhance accuracy in sentence extraction.

In addition, the sentence extraction system 1 specifies at least one other candidate sentence having a link to at least one candidate sentence having a score fulfilling the change criterion as at least one linked sentence, and determines not to extract the at least one candidate sentence specified as the linked sentence. For example, there is a case in which a sentence fulfilling the extraction condition can turn out to be a sentence that should not be extracted if context is taken into consideration. Hence, not extracting a linked sentence having a link to a candidate sentence not to be extracted makes it possible to prevent generation of noise, the noise being possibly generated due to extraction of such a sentence.

In addition, the sentence extraction system 1 sequentially selects a predetermined number of candidate sentences, beginning with one with a lower score, and changes the predetermined number of candidate sentences selected such that these candidate sentences are not extracted. That is, the predetermined number of candidate sentences selected in the order of a lower score are not very important sentences among the candidate sentences, and specifying a linked sentence of such an unimportant candidate sentence makes it possible to more efficiently prevent deterioration in accuracy in sentence extraction.

In addition, the sentence extraction system 1 sets a score of at least one non-candidate sentence not fulfilling the extraction condition to a predetermined value or does not calculate the score. For non-candidate sentences, superiority in probability in extraction cannot be determined as the scores of non-candidate sentences cannot be calculated in the first place or, if can, are not very different from each other. In this view, the evaluation of at least one candidate sentence having a score fulfilling the change criterion is reversed and sent, whereby generation of noise can be effectively prevented.

In addition, the sentence extraction system 1 specifies at least one linked sentence for every segment of a document that contains a plurality of sentences. This can prevent an evaluation from being sent to a sentence in a different segment.

In addition, the sentence extraction system 1 specifies at least one linked sentence, based on at least one of the connection property, referential property, and vocabular link property with respect to at least one candidate sentence. This enables accurate specification of a linked sentence.

In addition, the sentence extraction system 1 specifies at least one candidate sentence that contains at least one of the plurality of keywords, as indicated by the extraction condition. This enables accurate specification of a candidate sentence.

In addition, the sentence extraction system 1 extracts a performance factor sentence from a document such as financial reports. This can enhance accuracy in financial text mining that extracts useful knowledge from a set of texts.

5. Modified Examples

The present invention is not limited to the above-described embodiments, and can be desirably modified without departing from the gist of the present invention.

Figure 10:
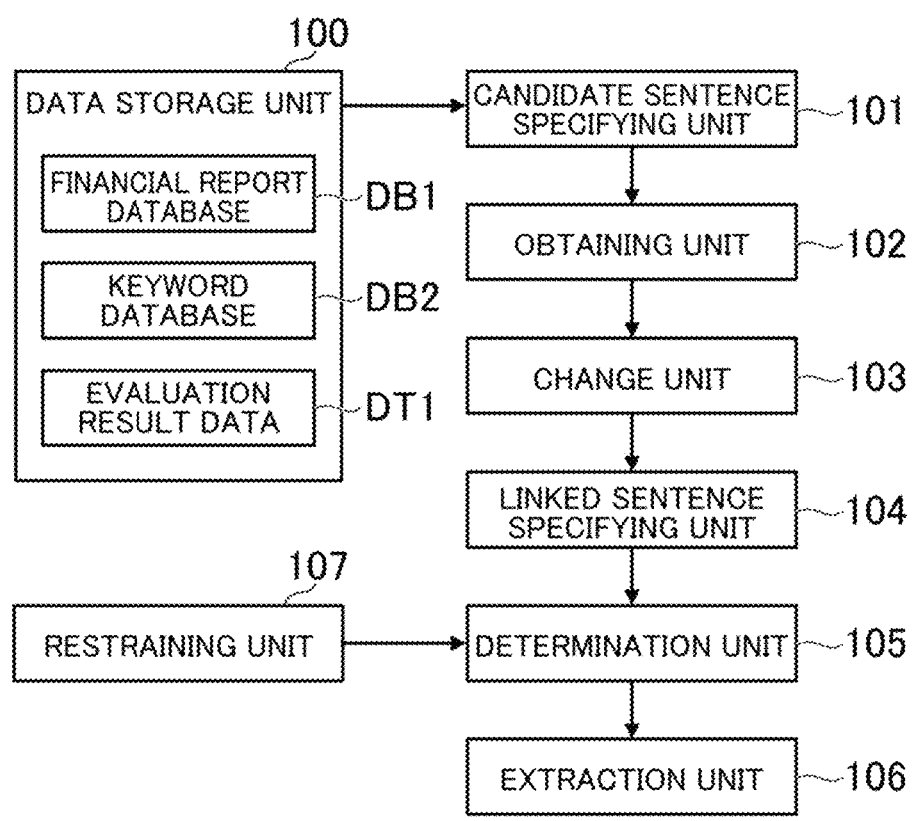
FIG. 10 is a functional block diagram in a modified example.

FIG. 10 is a functional block diagram for a modified example. As illustrated in FIG. 10, the sentence extraction system 1 in a modified example implements a restraining unit 107 in addition to the functions described in the embodiments. The restraining unit 107 is implemented mainly using the control unit 11. The restraining unit 107 restrains at least one candidate sentence having a score that fulfills a criterion higher than the change criterion from being determined as a sentence not to be extracted even if the candidate sentence has a link to at least one candidate sentence that fulfills the change criterion.

The meaning of the change criterion is as described above in the embodiment. Specifically, a case in which the score is minimum will be described here as one example. A higher criterion than the change criterion means that the order or the threshold of a score is higher than that for the change criterion. A higher criterion than the change criterion here is the same as the selection criterion described in the embodiment. A case in which the score is maximum will be described here as one example.

"To restrain" means not to send an evaluation, that is, not to change an evaluation. That is, "to restrain" corresponds to not to change an evaluation to the effect that the sentence should be extracted. For example, assume that a candidate sentence $s_M$ with a maximum score is specified as a linked sentence of a candidate sentence $s_L$ with a minimum. In this case, the restraining unit 107 restrains the evaluation of the candidate sentence $s_M$ with a maximum score from being changed.

A higher criterion than the change criterion can be different from the selection criterion. For example, the restraining unit 107 may restrain not only the evaluation of a candidate sentence $s_M$ with a maximum score but also those of the respective candidate sentences with the second to fifth highest scores from being changed. Further, for example, the restraining unit 107 may restrain the evaluations of all candidate sentences with scores equal to a threshold or over from being changed.

According to the above-described modified example, the evaluation of a candidate sentence with a lower score is not sent to a candidate sentence with a higher score. This can prevent omission of extraction of a sentence with a higher score as a performance factor sentence. This can efficiently enhance accuracy in sentence extraction.

The sentence extraction system 1 may omit the process of reversing the evaluation of a candidate sentence $s_L$ with a minimum score. In this case, candidate sentences are all performance factor sentences. The sentence extraction system 1 may send the evaluation of a candidate sentence to be extracted as a performance factor sentence, without reversing the evaluation. In this case, the sentence extraction system 1 can extract more sentences than those to be extracted according to a conventional method. In addition, for example, the sentence extraction system 1 may send not only the evaluation of a candidate sentence $s_M$ with a maximum score but also those of all candidate sentences to be extracted as performance factor sentences. In addition, for example, the sentence extraction system 1 may send the evaluations of some candidate sentences randomly selected or the evaluation of a candidate sentence selected by an administrator.

In addition, for example, the sentence extraction system 1 may reverse the evaluation of a candidate sentence randomly selected from among the candidate sentences with scores less than a threshold or the evaluation of a candidate sentence selected by an administrator, rather than reversing the evaluation of a candidate sentence $s_L$ with a minimum score. Alternatively, for example, a condition for reversing an evaluation may be prepared in advance, so that the sentence extraction system 1 may reverse the evaluation of a candidate sentence that fulfills the condition. This condition can be, for example, that the sentence contains a keyword obviously not a performance factor sentence or that the characteristic amount of the entire sentence falls in a predetermined range. In addition, for example, the sentence extraction system 1 can calculate the score of a non-candidate sentence as well. Also, for example, a linked sentence can be specified among the sentences in a different segment as well, irrespective of the segments.

Although, for example, a case in which the respective functions are implemented in the server 10 has been described, the functions can be implemented by a plurality of computers. For example, the server 10 and the user terminal 20 can share the respective functions, or a plurality of server computers can share the functions. In this case, the result of processing is sent/received via the network N, so that the functions can be shared. Also, for example, the data, described as being stored in the data storage unit 100, can be stored in any computer other than the server 10.

The invention claimed is:

1. A sentence extraction system comprising at least one processor configured to:
   obtain a score based on an extraction condition for a plurality of candidate sentences,
   sequentially select a predetermined number of candidate sentences, beginning with a candidate sentence with a higher score,
   select at least one linked sentence for every candidate sentence selected,
      wherein the at least one linked sentence has a score that fulfills a predetermined selection criterion,
      wherein the at least one linked sentence does not fulfill the extraction condition, and
      wherein the at least one linked sentence has a link to the candidate sentence, and
   determine whether to extract the at least one linked sentence, based on whether to extract the at least one candidate sentence.

2. The sentence extraction system according to claim 1, wherein the at least one processor:
   obtains a score based on the extraction condition for every candidate sentence, and
   changes the at least one candidate sentence whose score fulfills a predetermined change criterion such that the at least one candidate sentence is not extracted.

3. The sentence extraction system according to claim 2, wherein the at least one processor:
   specifies at least one other candidate sentence that has a link to the at least one candidate sentence whose score fulfills the predetermined change criterion, as the at least one linked sentence, and
   determines not to extract the at least one linked sentence.

4. The sentence extraction system according to claim 2, wherein
   the change criterion is an order of the score, and
   the at least one processor sequentially selects a predetermined number of candidate sentences, beginning with a candidate sentence with a lower score, and changes the predetermined number of candidate sentences selected such that the predetermined number of candidate sentences selected are not extracted.

5. The sentence extraction system according to claim 3, wherein the score of at least one non-candidate sentence that does not fulfill the extraction condition among the plurality of sentences is set to a predetermined value or is not calculated.

6. The sentence extraction system according to claim 3, wherein the at least one processor restrains the at least one candidate sentence whose score fulfills a higher criterion than the change criterion from being determined as a sentence not to be extracted even though the at least one candidate sentence has a link to the at least one candidate sentence that fulfills the change criterion.

7. The sentence extraction system according to claim 1, wherein
- a document containing the plurality of sentences is divided into a plurality of parts, and
- the at least one processor specifies the at least one linked sentence for every part.

8. The sentence extraction system according to claim 1, wherein the at least one processor specifies the at least one linked sentence, based on at least one of connection property, referential property, and vocabular link property with respect to the at least one candidate sentence.

9. The sentence extraction system according to claim 1, wherein
- the extraction condition indicates that at least one keyword among a plurality of keywords is contained, and
- the at least one processor specifies the at least one candidate sentence that contains the at least one keyword.

10. The sentence extraction system according to claim 1, wherein
- each of the plurality of sentences is related to content of a financial settlement of a company, and
- the extraction condition is a condition for extracting a performance factor sentence that describes a factor for performance.

11. A method for extracting a sentence, comprising:
- obtaining a score based on an extraction condition for a plurality of candidate sentences,
- sequentially selecting a predetermined number of candidate sentences, beginning with a candidate sentence with a higher score,
- selecting at least one linked sentence for every candidate sentence selected,
  - wherein the at least one linked sentence has a score that fulfills a predetermined selection criterion,
  - wherein the at least one linked sentence does not fulfill the extraction condition, and
  - wherein the at least one linked sentence has a link to the candidate sentence, and
- determining whether to extract the at least one linked sentence, based on whether to extract the at least one candidate sentence.

12. A non-transitory information storage medium storing a program for causing a computer to:
- obtain a score based on the extraction condition for a plurality of candidate sentences,
- sequentially select a predetermined number of candidate sentences, beginning with a candidate sentence with a higher score,
- select at least one linked sentence for every candidate sentence selected,
  - wherein the at least one linked sentence has a score that fulfills a predetermined selection criterion,
  - wherein the at least one linked sentence does not fulfill the extraction condition, and
  - wherein the at least one linked sentence has a link to the candidate sentence, and
- determine whether to extract the at least one linked sentence, based on whether to extract the at least one candidate sentence.

13. The sentence extraction system according to claim 1, wherein the predetermined extraction condition is based on the presence of a keyword.

* * * * *